G. W. KERR AND L. A. PRAY.
AUTOMOBILE HOOD CLAMP.
APPLICATION FILED APR. 30, 1919.
1,312,078.
Patented Aug. 5, 1919.
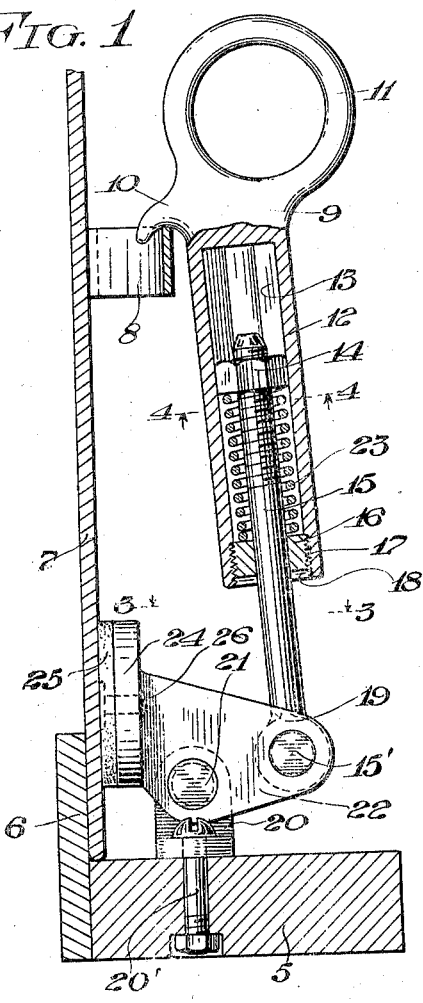
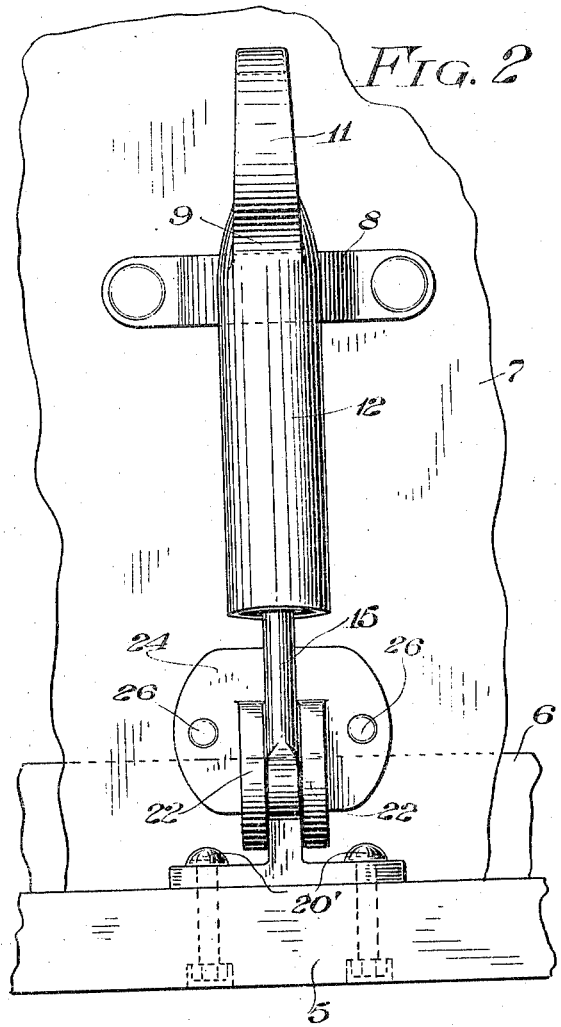
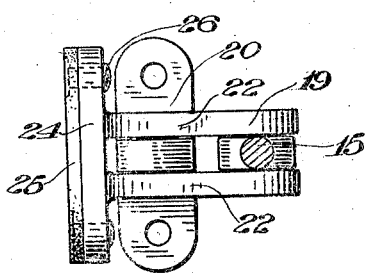
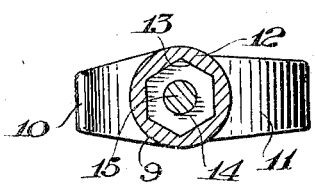
WITNESSES
INVENTOR
George W. Kerr &
Lucian A. Pray
By R. S. Caldwell ATTORNEY.

UNITED STATES PATENT OFFICE.

GEORGE W. KERR AND LUCIAN A. PRAY, OF RACINE, WISCONSIN.

AUTOMOBILE-HOOD CLAMP.

1,312,078.

Specification of Letters Patent.   Patented Aug. 5, 1919.

Application filed April 30, 1919.  Serial No. 293,834.

*To all whom it may concern:*

Be it known that we, GEORGE W. KERR and LUCIAN A. PRAY, citizens of the United States, and residents of Racine, in the county of Racine and State of Wisconsin, have invented new and useful Improvements in Automobile-Hood Clamps, of which the following is a description, reference being had to the accompanying drawings, which are a part of this specification.

The invention relates to automobile hood clamps and has for its object to provide a clamp for securing the engine hood to the frame of the automobile so as to prevent rattling, which frequently occurs with the usual type of clamp.

A further object of the invention is to provide a clamp in which a hook acts downwardly to hold the hood down against the frame of the automobile and in which a clamping member acts laterally against the lower edge of the hood to clamp said edge between it and a side frame portion adjacent the hood.

A further object of the invention is to provide a clamp in which the clamping hook and clamping member are yieldingly held in clamping engagement with the hood by a single spring.

The invention further consists in the several features hereinafter set forth and more particularly defined by claims at the conclusion hereof.

In the drawings: Figure 1 is a vertical sectional view through the device embodying the invention; Fig. 2 is a front elevation view thereof; Fig. 3 is a section taken on the line 3—3 of Fig. 1; Fig. 4 is a section taken on the line 4—4 of Fig. 1.

In the drawings the numeral 5 designates the portion of the frame of an automobile, 6 a marginal side frame portion, 7 a part of the side of the hood of an automobile and 8 one of the U-shaped straps secured to the side of the hood to coöperate with the clamping device hereinafter described.

The hood clamp consists of a hold down clamp for holding the sides of the hood down against the base 5, and a side engaging clamp for securing the sides of the hood between it and the side frame portion 6.

The hold down clamp consists of a member 9 having a hook 10, handle 11 and shank 12, provided with a bore 13 of hexagonal cross section, in which a nut 14 is slidably mounted. This nut is threaded on to the end of a rod 15 slidably mounted in a plug 16 having threaded engagement with the threaded ends 17 of the shank 12 and provided with slots 18 for turning it into place by the use of a suitable spanner wrench. The rod 15 is pivotally mounted at its lower end on a pin 15′ on a lever 19, which lever is pivotally mounted intermediate its ends upon a bracket 20. by means of a pin 21, said lever having spaced ears 22 in which the pivotal mountings for the bracket and rod are carried. The bracket 20 is secured to the frame 5 by means of bolts 20′. A spring 23 is interposed between the plug 16 and the nut 14 and the degree of compression of this spring may be varied by screwing the nut 14 down upon the rod 15 by turning the member 9.

With the construction thus far described, the hook 10 is adapted to be brought into engagement with the strap 8, as shown in Fig. 1, and when so engaged it will be yieldingly maintained in this position to hold the edge of the hood down against the frame 5 by means of the downward pressure exerted against the hook through the spring 23, which forms a yielding connection between the member 9 and the rod 15 connecting said member with the lever 19 and the bracket 20.

The side engaging clamp consists of a clamping plate 24 formed on the end of the lever 19 adjacent the hood and carries a facing 25 of felt, leather or other suitable material, which is secured to the plate by rivets 26. The main part of the clamping plate 24 is disposed above the horizontal axis of the pin 21, so that as the spring 23 pulls upwardly on the rod 15 and downwardly on the hold down clamp the upward force exerted on the rod will swing the lever 19 about the pivot 21 to cause the side engaging clamp 24, 25 to yieldingly bear against the side of the hood adjacent its lower edge and thereby clamp said hood between the pad 25 and the side frame portion 6. Thus it will be noted that the spring 23 serves the double purpose of holding both clamps in position and that the rod 15 and lever 19 constitute in effect a common connection for the clamps which are carried by the base bracket 20.

It is to be understood that this invention is not limited to any specific form or arrangement of parts except in so far as said limitations are specified in the claims.

What we claim as new and desire to secure by Letters Patent is:

1. In an automobile hood clamp, the combination of a hold down clamp, and a side engaging clamp operatively connected together.

2. In an automobile hood clamp, the combination of a hold down clamp, a side engaging clamp, and a connection between the clamps including a spring to yieldingly maintain them in clamping engagement with the hood.

3. In an automobile hood clamp, the combination of a hold down hook, a side clamping member, a lever upon which the clamping member is mounted, a rod pivotally connected to the lever, and a spring connection between said rod and said hook whereby both hook and side clamp are yieldingly maintained in clamping engagement with the hood.

4. In an automobile hood clamp, the combination of a hold down hook having a shank provided with a polygonal bore, a cap at the end of the bore, a side clamping member, a lever upon which the clamping member is mounted, a rod pivotally connected to the lever and slidably mounted in the cap and extending into the bore, a polygonal nut slidably mounted in the bore and adjustably carried by the rod, and a spring interposed between said nut and cap.

5. In an automobile hood clamp, the combination of a hold down hook having a shank provided with a bore, a cap at one end of the bore, a rod slidably mounted in the cap and extending into the bore, a member slidably but non-rotatably mounted in the bore and adjustably threaded on the rod, a spring interposed between said nut and cap, and means connecting said rod with a fixed part of the automobile.

6. In an automobile hood clamp, the combination of a hold down hook having a shank provided with a polygonal bore, a cap at one end of the bore, a rod slidably mounted in the cap and extending into the bore, a polygonal nut slidably mounted in the bore and adjustably threaded on the rod, a spring interposed between said nut and cap, and means connecting said rod with a fixed part of the automobile.

In testimony whereof, we affix our signatures, in presence of two witnesses.

GEORGE W. KERR.
LUCIAN A. PRAY.

Witnesses:
SUMNER H. HANCOCK,
FRANK C. HARDEN.